Patented Sept. 4, 1928.

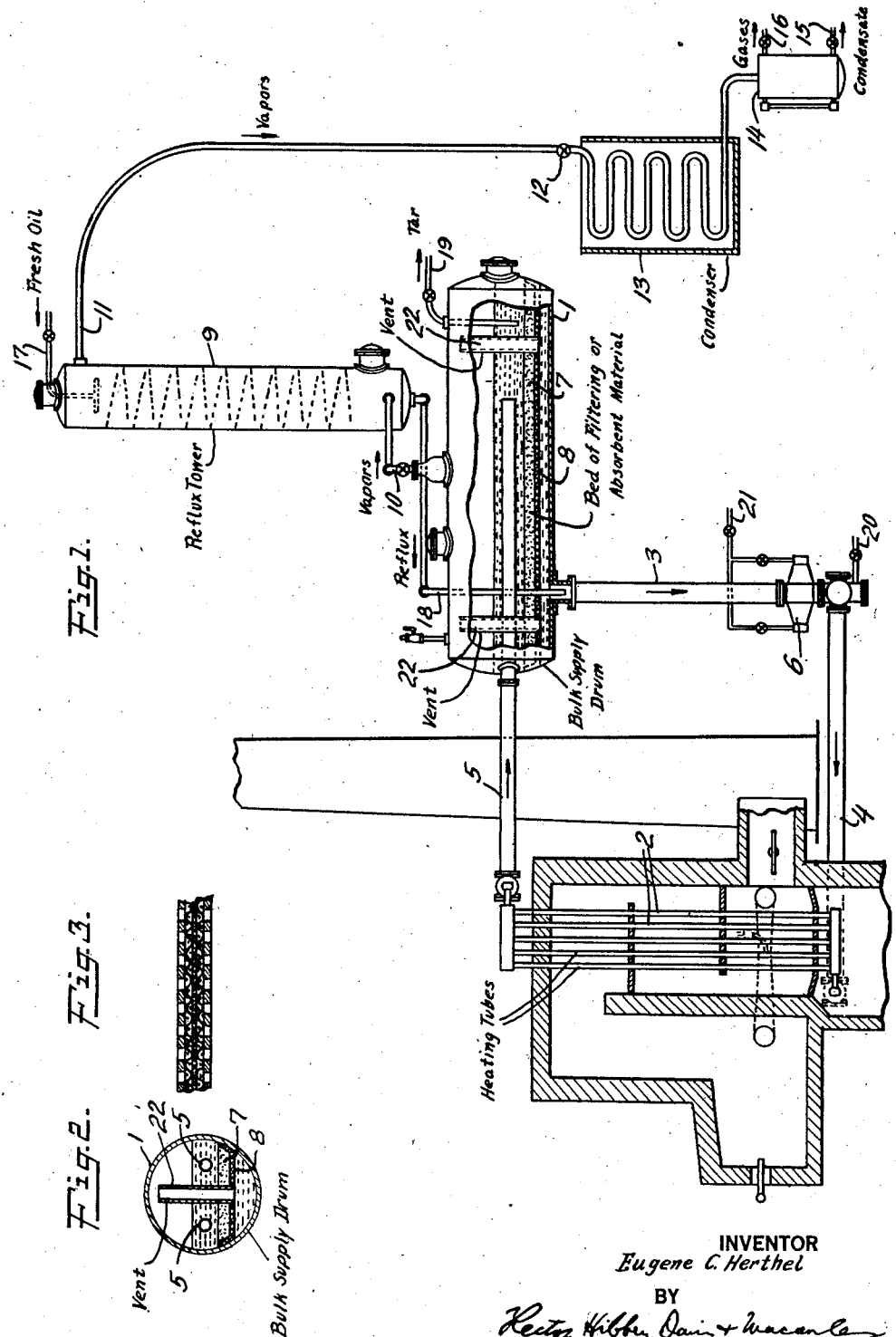

1,683,184

UNITED STATES PATENT OFFICE.

EUGENE C. HERTHEL, OF CHICAGO, ILLINOIS, ASSIGNOR TO SINCLAIR REFINING COMPANY, OF NEW YORK, N. Y., A CORPORATION OF MAINE.

APPARATUS FOR CRACKING HYDROCARBONS.

Application filed June 11, 1927. Serial No. 198,246.

This invention relates to improvements in the distilling under pressure of heavier and higher boiling hydrocarbon oils, such as gas oil, for the production therefrom of lighter and lower boiling hydrocarbon oils, such as gasoline and gasoline-containing distillates.

In one advantageous method of carrying out such pressure distillation, a charge of heavier oil is circulated in a still made up of a bulk supply drum and a battery of heating tubes through which the oil is circulated from and back to the bulk supply drum, a bed of finely divided absorbent or filtering material being arranged in the bulk supply drum so that the circulating unvaporized oil is compelled to pass therethrough, vapors being separated from the circulating oil as it is discharged into the bulk supply drum from the battery of heating tubes. In such operation, cracking continues in the circulating charge of oil as long as it is at a cracking temperature, and as a consequence there is a tendency to separation of vapors and gases from the circulating oil after it has passed through the bed of filtering or absorbent material and before it enters the battery of heating tubes. Likewise, there is a tendency to revaporization of reflux condensate returned and admixed with the circulating oil which has passed through the bed of filtering or absorbent material. The bed of filtering or absorbent material in the still assists in promoting complete separation of vapors from the oil discharged into the bulk supply drum from the battery of heating tubes, but nevertheless there is some tendency toward the formation of vapors in the circulating oil after it has passed through the bed of filtering or absorbent material. To the extent that these vapors are compelled to pass through the battery of heating tubes, there is a tendency to overcracking of constituents otherwise suitable as components of the desired product. To the extent that these vapors are confined beneath the bed of filtering or absorbent material, there is a tendency to retard the circulation of oil through the bed of filtering or absorbent material. The persent invention relates particularly to improvements in such operations, whereby the tendency toward the separation of vapors from the circulating oil after it has passed through the bed of filtering or absorbent material is reduced and whereby any vapors that may so be formed are taken off with the vapors separated from the hot oil discharged into the bulk supply drum.

The invention will be further described in connection with the accompanying drawings which illustrate, in a diagrammatic and conventional manner, a pressure still embodying the invention and adapted for the practice of the invention. In the accompanying drawings:

Fig. 1 is an elevation, partly in section and with parts broken away, of a pressure still system, Fig. 2 is a sectional view of the still drum shown in Fig. 1, and Fig. 3 is an enlarged fragmentary view, in section, of one form of support for the bed of filtering or absorbent material in the still.

The pressure still illustrated in the drawings comprises a bulk supply drum 1, a battery of heating tubes 2, and circulating connections 3, 4 and 5 including a circulating pump 6. A bed of filtering or absorbent material 7, such as fuller's earth, is arranged within the bulk supply drum on a support 8. This bed of filtering or absorbent material extends entirely across the bulk supply drum between the discharge circulating connection 3 and the return circulating connections 5, in effect dividing the space below the normal liquid level in the bulk supply drum into two compartments from one of which oil is circulated to the battery of heating tubes and into the other of which the oil from the battery of heating tubes is discharged, oil passing from the last to the first through the bed of filtering or absorbent material.

Vapors from the bulk supply drum enter the reflux tower 9, arranged above the bulk supply drum, through connection 10. Vapors from the reflux tower pass through connection 11 and valve 12, by which the pressure in the system may be regulated, to the condenser 13. This condenser discharges into the receiver 14. The distillate product is discharged from the receiver through connection 15 and uncondensed vapors and gases through connection 16. Fresh oil to be supplied to the operation is introduced into the upper end of the reflux tower through connection 17. Reflux condensate and admixed unvaporized fresh oil flow from the lower end of the reflux tower back to the pressure still through connection 18, which discharges into the circulating connection 3.

Connection 19 is provided for discharging pitch-laden oil or tar during operation, and connection 20 is provided for pumping out the still at the end of a run and for initially charging it at the beginning of a run. A part of the fresh oil supplied to the operation may be introduced through the bearings of the circulating pump 6 for cooling and lubrication by means of connection 21. In operation, it is advantageous to regulate the supply of fresh oil and the discharge of pitch-laden oil to maintain the concentration of pitch constituents below saturation in the oil entering the battery of heating tubes, as described in Letters Patent No. 1,598,136, issued to the Sinclair Refining Company, August 31, 1926, on my application.

One suitable form of the support 8 is illustrated more in detail in Fig. 3. As shown, this support comprises three screens and two perforated plates, a fine screen being arranged between two coarser screens and the group of screens being arranged between a pair of perforated plates. In an operation to produce a gasoline-containing pressure distillate from gas oil, for example, the bed of absorbent or filtering material in the bulk supply drum may consist of from four to seven tons of fuller's earth of from 16 to 30 mesh. After being initially charged with about 8,000 gallons of raw gas oil and being brought to cracking conditions of temperature and pressure, fresh oil may be supplied at a rate upwards of 2,500 gallons per hour and pitch-laden oil or tar withdrawn at a rate upwards of 1,500 gallons per hour. The pressure in the system may, for example, be maintained in the neighborhood of from 100 to 150 pounds per square inch.

In accordance with the present invention, vents are arranged between the upper part of the space below the bed of filtering or absorbent material and the space in the upper part of the bulk supply drum above the normal liquid level therein. In the pressure still illustrated, these vents comprise a pair of tubes 22 extending through the support 8 for the bed of filtering or absorbent material into the vapor space in the upper part of the bulk supply drum 1. In operation, as described, these vents permit the escape from beneath the support 8 and the bed of filtering or absorbent material 7, of any vapors separated from the oil which has passed through the bed of filtering material, into the vapor space in the upper part of the bulk supply drum 1 from which they pass together with vapors separated from the hot oil discharged into the bulk supply drum above the bed of filtering or absorbent material to the reflux tower 9. Similarly, any vapors separating from reflux condensate or fresh oil entering the still through connection 18 which are not carried with the circulating oil may escape through these vents. The provision of these vents also assists in equalizing, or in making more nearly equal, the pressures in the bulk supply drum above and below the bed of absorbent or filtering material and thus also assists in reducing the tendency to vaporization below the bed of filtering or absorbent material by reducing any pressure differential that may exist. In operation, it is advantageous to avoid too rapid forcing of the circulation through the battery of heating tubes.

I claim:

1. In a pressure still comprising a bulk supply drum in which a bed of filtering or absorbent material is arranged extending entirely across the drum and below the normal liquid level therein, a battery of heating tubes and connections for circulating oil from the space in the bulk supply drum beneath the bed of filtering or absorbent material through the battery of heating tubes and back to the space in the bulk supply drum above the bed of filtering or absorbent material, venting means connecting the upper part of the space beneath the bed of filtering or absorbent material and the space in the upper part of the bulk supply drum above the normal liquid level therein.

2. In a pressure still comprising a bulk supply drum in which a bed of filtering or absorbent material is arranged extending entirely across the drum and below the normal liquid level therein, a battery of heating tubes and connections for circulating oil from the space in the bulk supply drum beneath the bed of filtering or absorbent material through the battery of heating tubes and back to the space in the bulk supply drum above the bed of filtering or absorbent material, a reflux tower, connections for conducting vapors from the upper part of the bulk supply drum thereto and liquid return connections from the reflux tower discharging beneath the bed of filtering or absorbent material, venting means connecting the upper part of the space beneath the bed of filtering or absorbent material and the space in the upper part of the bulk supply drum above the normal liquid level therein.

In testimony whereof, I have subscribed my name.

EUGENE C. HERTHEL.